United States Patent [19]
Geller et al.

[11] Patent Number: 5,801,867
[45] Date of Patent: Sep. 1, 1998

[54] DC-COUPLED RECEIVER FOR SHARED OPTICAL SYSTEM

[75] Inventors: William L. Geller, Foster City; David M. Arstein, Scotts Valley; William F. Ellersick, Redwood City, all of Calif.

[73] Assignee: Ericsson Raynet, Menlo Park, Calif.

[21] Appl. No.: 619,851

[22] Filed: Mar. 20, 1996

[51] Int. Cl.$^6$ .................................................. H04B 10/06
[52] U.S. Cl. ............................. 359/189; 359/194; 330/11
[58] Field of Search .................... 359/189, 194, 359/195; 375/316, 318, 319, 345; 327/72, 54; 330/11

[56] References Cited

U.S. PATENT DOCUMENTS

| | | | |
|---|---|---|---|
| 4,363,977 | 12/1982 | Tsuda et al. | 307/358 |
| 4,380,815 | 4/1983 | Clendening | 375/76 |
| 4,389,622 | 6/1983 | Kackman | 375/376 |
| 4,714,828 | 12/1987 | Bacou et al. | 250/214 |
| 4,736,391 | 4/1988 | Sigel | 375/76 |
| 4,787,097 | 11/1988 | Rizzo | 375/376 |
| 5,025,456 | 6/1991 | Ola et al. | 375/76 |
| 5,319,679 | 6/1994 | Bagby | 375/106 |
| 5,319,680 | 6/1994 | Port et al. | 375/376 |
| 5,371,763 | 12/1994 | Ota et al. | 375/76 |
| 5,430,766 | 7/1995 | Ota et al. | 375/318 |
| 5,459,679 | 10/1995 | Ziperovish | 364/602 |
| 5,621,755 | 4/1997 | Bella et al. | 375/219 |

OTHER PUBLICATIONS

C.M. de Blok et al., *Fast Low Cost Feed-Forward Burst-Mode Optical Receiver For 622 Mb/s* (1993).

*Primary Examiner*—Rafael Bacares
*Attorney, Agent, or Firm*—Lyon & Lyon LLP

[57] ABSTRACT

A dc-coupled receiver for a shared optical system includes an input feedback amplifier circuit which establishes a dc reference baseline voltage level for incoming packets of data. A pair of sample-and-hold circuits are connected in parallel to receive and sample signals from the feedback amplifier circuit when no data is being transmitted and at the initial edge of incoming packets of data. A voltage divider circuit receiving signals from the sample-and-hold circuits establishes a dc slicing level for each incoming packet of data. An output feedback circuit can be added to compensate for offset error without affecting the performance of the sample-and-hold circuitry.

22 Claims, 3 Drawing Sheets

5,801,867

DC-COUPLED RECEIVER FOR SHARED OPTICAL SYSTEM

FIELD OF THE INVENTION

The present invention pertains to the field of optical communication networks.

BACKGROUND

Data transmission in a digitally modulated passive optical network ("PON") utilizes well-defined digital logic thresholds. For example, a known method of establishing digital logical ONE and ZERO voltage levels is to employ ac coupling between a receiver and a logic quantizer. This method works well for reception of continuous data transmission. However, because this method employs signal averaging, it is generally not suitable for receiving "burst-mode" data packets, i.e., because of the inherent varying time average. Thus, shared optical systems have traditionally used dc-coupled receivers for receiving packet data transmissions.

Traditionally, dc-coupled receivers have proven difficult to implement because of the requisite establishment of a logic reference voltage level within a few millivolts of the dc center, i.e., one-half of the sum of the minimum and maximum excursions of the data signal of the received data pulse. Further, it is uncommon for packet data transmissions to be sent over bus systems shared by many optical transmitters, wherein transmissions may be separated by only a few nanoseconds. Moreover, varying power-level attenuation can result from differing switching components and/or the distance of fiber optic cable traveled by the different signals within the shared system. The receiver therefore should be capable of handling closely spaced packet data signals having widely varying amplitudes. A dc-coupled receiver is disclosed in U.S. Pat. Nos. 5,371,763 and 5,430,766, both of which are assigned to AT&T Corporation, and are fully incorporated herein by reference. A dc-coupled digital data receiver should also be capable of greatly enhanced accuracy, especially regarding relatively low-level or "small" signals.

Thus, there is a need for a burst-mode digital data receiver that establishes well-defined digital logic thresholds for closely spaced packet data transmissions of widely varying power levels and remains accurate even for signals of relatively low amplitude.

SUMMARY OF THE INVENTION

The present invention is directed to a burst-mode digital data receiver for a shared optical system, which is advantageously equipped with a dc-coupled feedback amplifier circuit that establishes a dc reference "baseline" voltage level. In one embodiment a pair of sample-and-hold circuits are connected in parallel to receive a signal from the dc-coupled feedback amplifier circuit. Connected to receive a signal from the sample-and-hold circuits is a voltage divider circuit, which generates a signal with an amplitude equal to half the difference between the voltage levels generated by the two sample-and-hold circuits. The use of highly sensitive sample-and-hold circuits allows a dc-coupled receiver having features of the present invention to establish extremely accurate reference levels even for signals of very low amplitude. In one aspect of the invention, an autobalance or error-detection/correction feedback circuit allows the receiver to compensate for error without affecting the performance of the sample-and-hold circuitry.

DETAILED DESCRIPTION OF THE PREFERRED EMBODIMENTS

Figure 1:
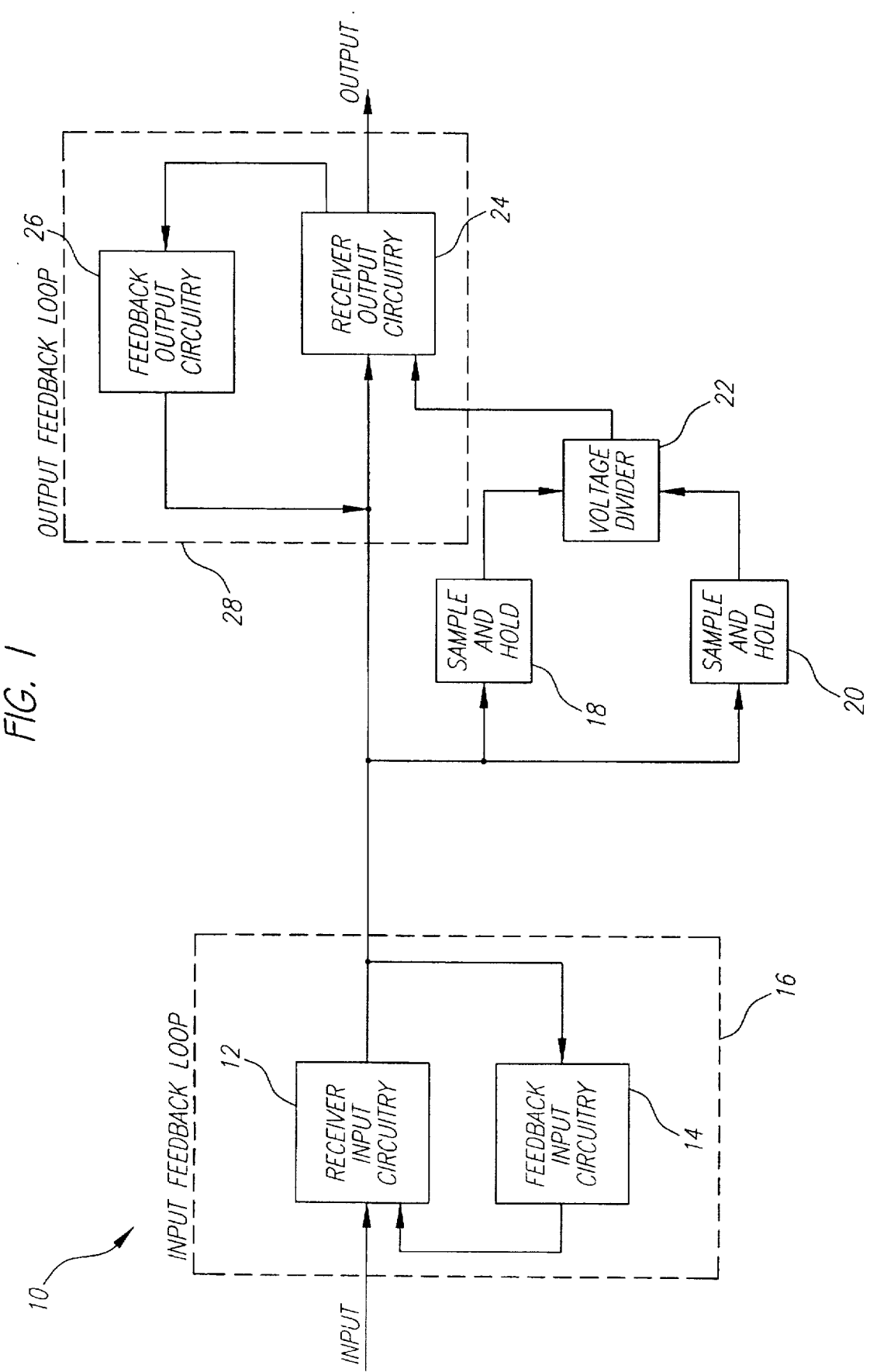
FIG. 1 is a block diagram of a dc-coupled receiver embodying features of the present invention.

With reference to FIG. 1, a dc-coupled receiver 10 embodying features of the instant invention is illustrated in block-diagram form. An input to the receiver 10 is electrically connected to receiver input circuitry 12. An output from the receiver input circuitry 12 is electrically connected to feedback input circuitry 14. An output from the feedback input circuitry 14 is electrically fed back into the receiver input circuitry 12. An input feedback loop 16 is created at the input to the receiver 10.

Referring still to FIG. 1, the output from the receiver input circuitry 12 is also electrically fed into first and second sample-and-hold circuits 18, 20. The first sample-and-hold circuit 18 is connected in parallel with the second sample-and-hold circuit 20. Outputs from the first and second sample-and-hold circuits 18, 20 are electrically connected to a voltage divider circuit 22. An output from the voltage divider circuit 22 is electrically fed into receiver output circuitry 24. Additionally, the output from the receiver input circuitry 12 is electrically connected to the receiver output circuitry 24.

FIG. 1 shows also that an output from the receiver output circuitry 24 is electrically connected to feedback output circuitry 26. An output from the feedback output circuitry 26 is fed back into the receiver output circuitry 24. An output from the receiver 10 is electrically connected to the receiver output circuitry 24. An output feedback loop 28 is created at the output from the receiver 10.

Figure 2:
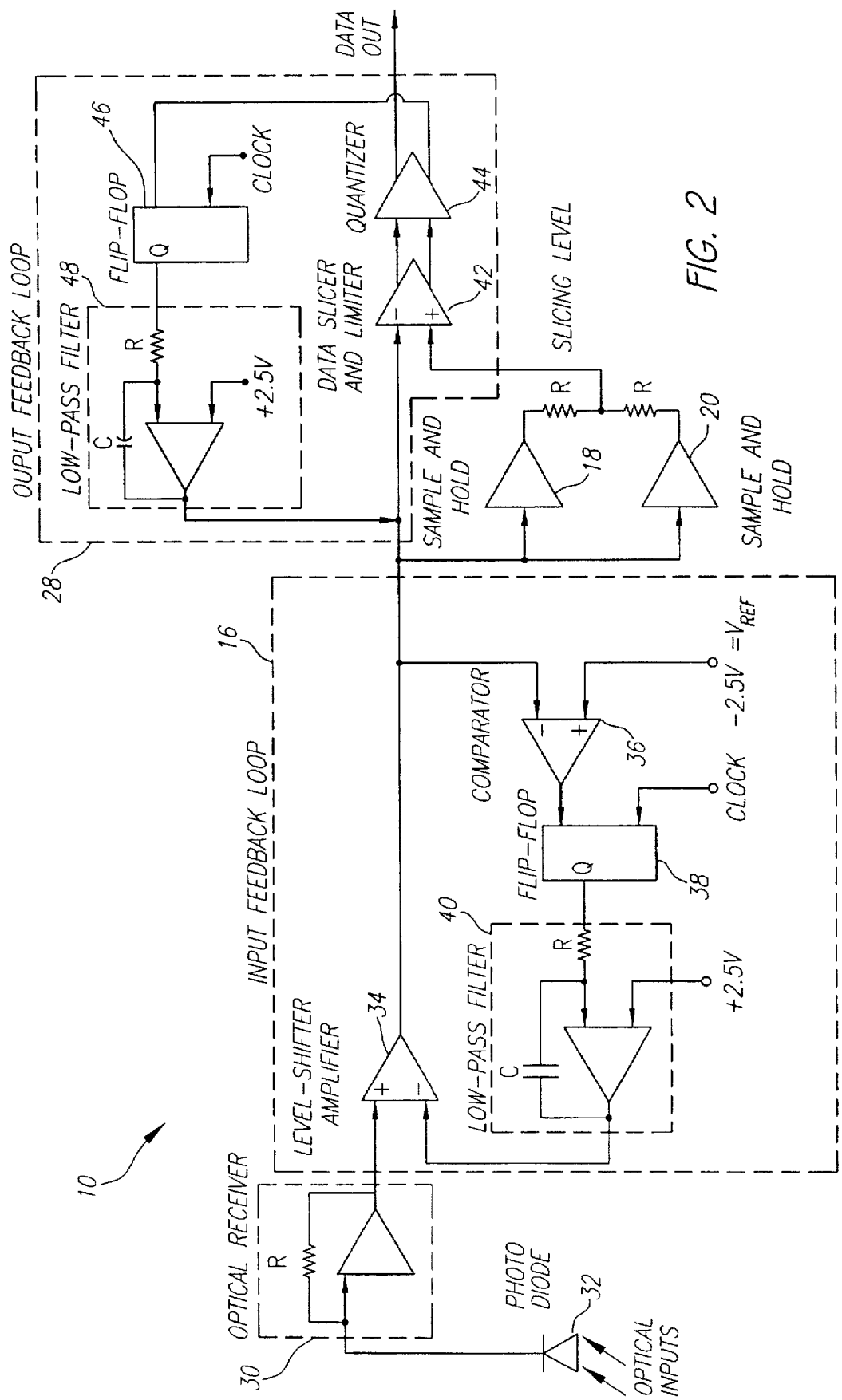
FIG. 2 is a more detailed block diagram illustrating various components of the device of FIG. 1.

Referring now to FIG. 2, a more detailed block diagram of a preferred embodiment of the present invention is depicted. As can be seen, an optical receiver circuit 30 is electrically connected to receive a signal from a photodiode 32 at the input to the receiver 10. The optical receiver circuit 30 preferably comprises an amplifier circuit (shown with feedback resistor R) of a type known in the art. An output from the optical receiver circuit 30 is electrically connected to the input feedback loop 16.

The input feedback loop 16 includes a conventional level-shifter amplifier circuit 34 with dual positive and negative inputs. The optical receiver circuit 30 is electrically connected to the positive input of the level-shifter amplifier circuit 34. A conventional, dual-input comparator amplifier circuit 36 has a negative input electrically connected to the output from the level-shifter amplifier circuit 34. The comparator 36 has a positive input electrically connected to a dc voltage source (not shown) set at a reference level of −2.5 volts. An output from the comparator 36 feeds into a conventional flip-flop circuit 38 which also receives a clock pulse. An output from the flip-flop circuit 38 is electrically connected to a conventional low-pass filter or integrator circuit 40. An input to the low-pass filter circuit 40 is electrically connected to a voltage source (not shown) biased to +2.5 volts. An output from the low-pass filter circuit 40 is fed back into the negative input of the level-shifter amplifier circuit 34. In a preferred embodiment, the low-pass filter circuit 40 comprises an input resistor R attached to an amplifier circuit having a feedback capacitor C. Alternatively, the low-pass filter circuit 40 can be implemented with transistor logic or digital techniques.

As discussed above in association with FIG. 1, an output from the input feedback loop 16 is electrically connected to the inputs of first and second conventional sample-and-hold circuits 18, 20 arranged in parallel. The output from the input feedback loop 16 is also fed into the output feedback loop 28. With reference again to FIG. 2, the output of the first sample-and-hold circuit 18 is electrically connected to a first resistor R. Similarly, the output of the second sample-and-hold circuit 20 is connected to a second resistor R. The two resistors are of equal resistance value and are electrically connected in series between the outputs of the first and second sample-and-hold circuits 18, 20.

An output taken from the point where the resistors are connected together is electrically connected to a positive input of a data-slicer-and-limiter circuit 42. The data-slicer-and-limiter circuit 42 is preferably a dual-input/dual-output limiter circuit of a type conventionally known in the art. The data-slicer-and-limiter circuit 42 has a positive input electrically connected to the output from the input feedback loop 16. Dual outputs from the data-slicer-and-limiter circuit 42 feed into dual inputs to a digital quantizer circuit 44. The digital quantizer circuit 44 is preferably a comparator circuit conventionally known in the art and having dual outputs.

A first output from the quantizer circuit 44 serves as a data output for the receiver 10. A second output from the quantizer circuit 44 is electrically connected to a conventional flip-flop circuit 46 which also receives a clock pulse. An output from the flip-flop circuit 46 is electrically connected to a conventional low-pass filter or integrator circuit 48. The low-pass filter circuit 48 has an input electrically connected to a dc voltage source (not shown) biased to +2.5 volts. An output from the low-pass filter circuit 48 is fed back into the negative input of the data-slicer-and-limiter circuit 42. In a preferred embodiment, the low-pass filter circuit 48 comprises an input resistor R attached to an amplifier circuit having a feedback capacitor C. Alternatively, the low-pass filter circuit 48 can be implemented with transistor logic or digital techniques.

In an especially preferred embodiment, the first and second sample-and-hold circuits 18, 20 are integrated circuits manufactured by Analog Devices, Inc. and commercially available under the part number AD783. The comparator 36 and quantizer 44 are integrated circuits manufactured by Analog Devices, Inc. and sold under the part number AD9686; alternatively, they can be made by Maxim, Inc. and sold under the part number MAX9686. The operational amplifier circuits used in the low-pass filter circuits 40, 48 are integrated circuits available generically under the part number LM2902. The flip-flop circuits 38, 46 are integrated circuits generically available under the part number 74HC74. The level-shifter amplifier circuit 34 and data-slicer-and-limiter circuit 42 comprise discrete transistor logic.

In operation, the optical receiver circuit 30 serves to convert photons into electrons. Thus, light received by the receiver 10 is converted into an electrical signal.

The input feedback loop 16 serves to establish a forced baseline dc voltage reference level of −2.5 volts. A signal is received by the positive input to the level-shifter amplifier circuit 34. From the output from the level-shifter amplifier circuit 34, the signal is fed into the comparator 36, which compares the lowest dc level of the signal with the reference level of −2.5 volts. The comparator generates either a digital ONE or a digital ZERO, depending on whether the lowest dc level received is less than or greater than the reference level of −2.5 volts. The varying ZEROES and ONES are sent to the flip-flop circuit 38, which is controlled by a clock pulse synchronized to enable the flip-flop circuit 38 to store the output of the comparator 36 at a preprogrammed time when no data packets are being transmitted. (The baseline voltage level is sampled at the output of the level-shifter amplifier circuit 34 at a time during which no signal is being transmitted: the keepout time shown in FIG. 3.) The low-pass filter circuit 40 integrates the ZEROES and ONES generated by the flip-flop circuit 38, producing a varying dc level equal to the time-averaged value of the ZEROES and ONES. This varying dc level is sent to the negative input of the level-shifter amplifier circuit 34. Because the output of the comparator 36 toggles randomly between ZERO and ONE when the negative input to the comparator 36 is at exactly −2.5 volts (i.e., the same value as at the positive input), the time-average of the numbers of ONES and ZEROES generated should be the same. The signal at the output of the level-shifter amplifier circuit 34 is thereby shifted by a dc voltage level equal to the difference between −2.5 volts and the lowest dc level of the incoming signal. This forces the lowest dc level of the signal to −2.5 volts. In sum, the input feedback loop 16 operates as an analog feedback loop which forces incoming data packets to a dc baseline level of −2.5 volts by (1) comparing the time average of the incoming signal's lowest level with −2.5 volts when no signal is being transmitted, and (2) shifting the baseline dc voltage level of the incoming signal accordingly.

Figure 3:
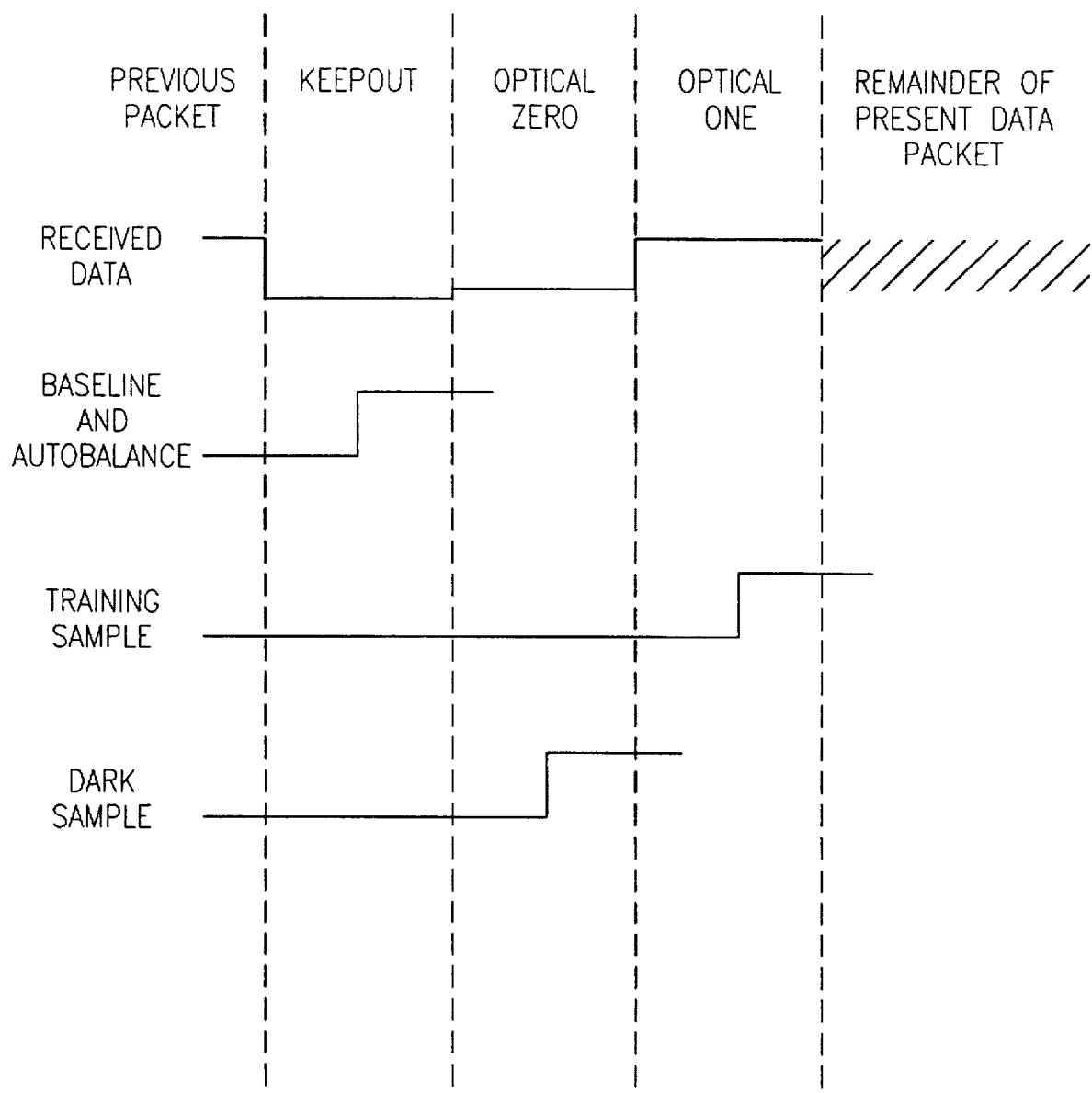
FIG. 3 is a timing diagram illustrating various sampling times in relation to a frame of received data packets.

The signal sent to the first and second sample-and-hold circuits 18, 20 is, as discussed above, a waveform that attains a lowest dc level of −2.5 volts. The first sample-and-hold circuit 18 samples and stores a dc level referred to as a training sample. With reference to FIG. 3, the training sample is taken from the signal at a time when the initial part of a data packet has been transmitted. The initial part of each data packet comprises data protocol; thus, a series of ZEROES followed by a series of ONES accompanies each packet and is the first data to arrive. The training sample is taken as the ONES are received. This allows the training sample to correspond to the highest dc level—or peak value—of the signal. The second sample-and-hold circuit 20 samples and stores a dc level referred to as a dark sample. Referring again to FIG. 3, the dark sample is taken from the signal as the initial ZEROES are being received. The voltage divider configuration at the outputs of the first and second sample-and-hold circuits 18, 20 uses two resistors of equal value. The resultant signal is a varying dc level referred to as the slicing level, which is equal to −2.5 volts plus one-half of the peak-to-peak value of the signal (i.e., −2.5 volts plus one-half of the difference between the training sample and the dark sample). The slicing level is sent to the positive input to the data-slicer-and-limiter circuit 42.

The negative input to the data-slicer-and-limiter circuit 42 receives the signal from the input feedback loop 16. The data-slicer-and-limiter circuit 42 serves to limit gain by clipping both the positive and negative peaks of the incoming signal. The dual outputs of the data-slicer-and-limiter circuit 42 are complementary. The complementary signals are sent to the dual inputs of the quantizer 44, which squares the edges of the signals and produces complementary digital signals at the dual outputs from the quantizer 44. One output carries the receiver output data; the other output is fed back into the output feedback loop 28.

The output feedback loop 28 serves as an error-detection/correction, or autobalance, circuit. ZEROES and ONES generated by the quantizer 44 are sent to the flip-flop circuit 46, which is controlled by a clock pulse synchronized to enable the flip-flop circuit 46 to store the output of the quantizer 44 at a preprogrammed time when no data packets are being transmitted. (The autobalance signal is sampled with the previously discussed baseline reference voltage level at the output of the level-shifter amplifier circuit 34 during the keepout time shown in FIG. 3.) The low-pass filter circuit 48 integrates the ZEROES and ONES generated by the flip-flop circuit 46, producing a varying dc level equal to the time-averaged value of the ZEROES and ONES. This varying dc level is fed back into the signal as shown in FIG. 2. Offset error results from small differences between the voltage levels at the dual inputs to the quantizer 44 when no signal is being transmitted to it. Ideally (i.e., if there is absolutely no difference between the dc voltage levels at the dual inputs to the quantizer 44 with no signal being transmitted), the output from the quantizer 44 should toggle randomly between ZERO and ONE when no signals are being sent to the quantizer 44. The time average of the numbers of ONES and ZEROES generated should therefore be the same. Thus, the output feedback loop 28 makes minor adjustments to the dc slicing level to compensate for error. The output feedback loop 28 operates as a digital feedback loop which compensates for offset error caused by the quantizer 44 itself or contributed by the first and second sample-and-hold circuits 18, 20. In sum, the output feedback loop 28 compensates for offset error by (1) comparing the slicing level of the signal with the time average of ZEROES and ONES generated by the quantizer 44 when no signal is being transmitted, and (2) adjusting the slicing level accordingly.

While preferred embodiments have been shown and described, numerous alterations may be made without departing from the spirit or scope of the invention. Therefore, the invention is not to be limited except in accordance with the following claims.

What is claimed is:

1. A digital data receiver, comprising:
   a dc-coupled feedback amplifier circuit;
   a first sample-and-hold circuit electrically connected to said dc-coupled feedback amplifier circuit;
   a second sample-and hold circuit electrically connected to said dc-coupled feedback amplifier circuit; and
   means for generating a signal with an amplitude equal to half of the difference between a first voltage level generated by said first sample-and-hold circuit and a second voltage level generated by said second sample-and-hold circuit, said means for generating connected to said first and second sample-and-hold circuits to receive signals therefrom.

2. A digital data receiver, comprising:
   a dc-coupled feedback amplifier circuit;
   a first sample-and-hold circuit electrically connected to said dc-coupled feedback amplifier circuit;
   a second sample-and hold circuit electrically connected to said dc-coupled feedback amplifier circuit;
   a voltage divider; and
   a data-slicer-and-limiter circuit electrically connected to said voltage divider, and said data-slicer-and-limiter circuit also electrically connected to said dc-coupled feedback amplifier circuit to receive a signal therefrom.

3. The digital data receiver of claim 1, wherein said dc-coupled feedback amplifier circuit receives a digital data signal comprising discrete packets of data.

4. The digital data receiver of claim 1, wherein said dc-coupled feedback amplifier circuit comprises:
   a comparator connected to a voltage source;
   a flip-flop connected to said comparator;
   a low-pass filter connected to said flip-flop; and
   a level-shifter amplifier connected to said low-pass filter, said level-shifter amplifier also connected to said comparator to send a signal thereto.

5. The digital data receiver of claim 4, wherein said comparator generates a digital ONE or a digital ZERO depending on whether the dc reference baseline voltage level is greater or less than the amplitude of the signal generated by said dc-coupled feedback amplifier circuit at a time when no digital data is being transmitted.

6. The digital data receiver of claim 4, wherein said level-shifter amplifier receives a time-varying dc signal having an amplitude corresponding to the time average of digital ONES and ZEROES generated by said comparator and stored in said flip-flop.

7. The digital data receiver of claim 1, wherein said dc-coupled feedback amplifier circuit generates a dc reference baseline voltage level of −2.5 volts.

8. The digital data receiver of claim 4, wherein said low-pass filter comprises a resistor-capacitor network.

9. The digital data receiver of claim 4, wherein said low-pass filter comprises a transistor array.

10. The digital data receiver of claim 1, further comprising means for receiving an optical signal and converting the optical signal into an electronic digital data signal, said means for receiving and converting connected to said dc-coupled feedback amplifier circuit to send a signal thereto.

11. The digital data receiver of claim 1, wherein said first sample-and-hold circuit establishes a digital logic level ONE by sampling and storing a digital signal received from said dc-coupled feedback amplifier circuit at a time when initial bits of a discrete packet of digital data have been received, said bits having been preset to digital logic level ONE, and wherein said second sample-and-hold circuit establishes a digital logic level ZERO by sampling and storing a digital signal received from said dc-coupled feedback amplifier circuit at a dark time in between transmission of discrete digital data packets.

12. The digital data receiver of claim 1, wherein said first and second sample-and-hold circuits are contained in a single sample-and-hold device.

13. The digital data receiver of claim 1, wherein said means for generating comprises a voltage divider and a data-slicer-and-limiter circuit, said data-slicer-and-limiter circuit connected to said voltage divider to receive a signal therefrom, and said data-slicer-and-limiter circuit also connected to said dc-coupled feedback amplifier circuit to receive a signal therefrom.

14. The digital data receiver of claim 13, further comprising a logic quantizer connected to said data-slicer-and-limiter circuit to receive a signal therefrom.

15. The digital data receiver of claim 14, further comprising an error-detection/correction feedback circuit connected to receive a signal from said logic quantizer and send a signal to said data-slicer-and-limiter circuit.

16. The digital data receiver of claim 15, wherein said error-detection/correction feedback circuit comprises a flip-flop connected to said logic quantizer to receive a signal therefrom, and a low-pass filter connected to said flip-flop to receive a signal therefrom, said low-pass filter also connected to send a signal to said data-slicer-and-limiter circuit.

17. The digital data receiver of claim 16, wherein said low-pass filter comprises an integrator circuit.

18. The digital data receiver of claim 16, wherein said low-pass filter comprises a resistor-capacitor network.

19. The digital data receiver of claim 16, wherein said low-pass filter comprises a transistor array.

20. The digital data receiver of claim 1, further comprising an analog-to-digital converter circuit connected to said means for generating to receive a signal therefrom.

21. A shared optical system, comprising:

a dc-coupled feedback amplifier circuit for establishing a dc reference baseline voltage level;

means for receiving an optical signal and converting the optical signal into an electronic digital data signal, said means for receiving and converting connected to said dc-coupled feedback amplifier circuit to send a signal thereto;

a first sample-and-hold circuit connected to said dc-coupled feedback amplifier circuit to receive a signal therefrom;

a second sample-and hold circuit connected to said dc-coupled feedback amplifier circuit to receive a signal therefrom; and means for generating a signal with an amplitude equal to half of the difference between a first voltage level generated by said first sample-and-hold circuit and a second voltage level generated by said second sample-and-hold circuit, said means for generating connected to said first and second sample-and-hold circuits to receive signals therefrom.

22. An optical signal receiver, comprising:

a dc-coupled feedback amplifier circuit for establishing a dc reference baseline voltage level;

means for receiving an optical signal and converting the optical signal into an electronic digital data signal, said means for receiving and converting connected to said dc-coupled feedback amplifier circuit to send a signal thereto;

a first sample-and-hold circuit connected to said dc-coupled feedback amplifier circuit to receive a signal therefrom;

a second sample-and hold circuit connected to said dc-coupled feedback amplifier circuit to receive a signal therefrom;

means for generating a signal with an amplitude equal to half of the difference between a first voltage level generated by said first sample-and-hold circuit and a second voltage level generated by said second sample-and-hold circuit, said means for generating connected to said first and second sample-and-hold circuits to receive signals therefrom;

a logic quantizer connected to said means for generating to receive a signal therefrom; and an error-detection/correction feedback circuit connected to said logic quantizer to receive a signal therefrom, said error-detection/correction circuit connected to feed a signal back into the optical signal receiver.

* * * * *